United States Patent
Shimizu et al.

(10) Patent No.: US 7,206,402 B2
(45) Date of Patent: Apr. 17, 2007

(54) METHOD OF AND SYSTEM FOR CALL SERVICE SYSTEM, AND COMPUTER PRODUCT

(75) Inventors: Hiroko Shimizu, Kawasaki (JP); Hideshi Hamamatsu, Kawasaki (JP); Fumito Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 289 days.

(21) Appl. No.: 09/842,894

(22) Filed: Apr. 27, 2001

(65) Prior Publication Data

US 2002/0021792 A1    Feb. 21, 2002

(51) Int. Cl.
*H04M 5/00* (2006.01)
(52) U.S. Cl. .............................. 379/265.09; 379/88.13; 379/265.12; 379/266.02
(58) Field of Classification Search ............. 379/265.02, 379/265.09, 265.01, 265.05, 265.11, 265.13, 379/266.01, 266.06, 266.02
See application file for complete search history.

(56) References Cited

U.S. PATENT DOCUMENTS

| | | | | | |
|---|---|---|---|---|---|
| 5,479,487 | A | * | 12/1995 | Hammond | ................ 379/88.22 |
| 5,742,675 | A | * | 4/1998 | Kilander et al. | ........ 379/266.09 |
| 5,982,873 | A | * | 11/1999 | Flockhart et al. | ....... 379/266.02 |
| 6,233,332 | B1 | * | 5/2001 | Anderson et al. | ....... 379/265.09 |
| 6,263,066 | B1 | * | 7/2001 | Shtivelman et al. | ... 379/266.06 |
| 6,389,132 | B1 | * | 5/2002 | Price | ..................... 379/265.01 |

* cited by examiner

*Primary Examiner*—Fan Tsang
*Assistant Examiner*—Simon Sing
(74) *Attorney, Agent, or Firm*—Staas & Halsey LLP (57) ABSTRACT

A user is made to select among a retrieval of a knowledge data base, an inquiry through an electronic mail, and receipt of an answer to an inquiry through a telephone. This selection may be made through a homepage. When the user has selected a telephone call as a mode of receiving the answer, the operator makes a telephone call to the user using the operator's terminal.

9 Claims, 11 Drawing Sheets

FILE(F)  EDIT(E)  DISPLAY(V)  SHIFT(G)  FAVORITE(A)  HELP(H)

LINK  WINDOWS UPDATE  INTERNET START

CASE NAME UNSET 4

USER CODE : 201808    NAME IN CHINESE CHARACTERS : 清水    NAME IN KANA CHARACTERS : シミズ ユウコ    ENROLLED COMPANY :

BUSINESS TYPE CODE : 1234    DEPARTMENT : 1234    COMPANY : 1234    RETRIEVAL OF USER : ANONYMOUS    CLEAR

OFFICE BUILDING : OUTSIDE SYSTEM DUMMY OFFICE (9990)    CLASS :    ▼ DATE OF FILE : 2000/01/26  19:04:33

TELEPHONE NUMBER : 0123-45-6789

| CASE | RETRIEVE | PAST CASE |

FORM OF INQUIRY : SECTION 1 ▼    CATEGORY : BUSINESS 1 ▼    EVALUATION : NONE ▼

CONTENTS OF INQUIRY :

CONTENTS OF ANSWER :

TRANSMISSION HISTORY : [UN-TRANSMISSION]    MAIL TRANSMISSION

MAIL ANSWER RECEIVING END ADDRESS

NEXT CASE
STORE CASE
ACQUIRE SOLUTION
ESCALATION
JOB REQUEST
CALL-BACK
SOLUTION END
CLOSE

STAND-BY                                                                                        CASE NAME UNSET 4        SYSTEM  19:20

FIG. 7

NEW INQUIRY

FILE(F) EDIT(E) DISPLAY(V) SHIFT(G) FAVORITE(A) HELP(H)

ADDRESS http://jinji1/ht

LINK  WINDOWS UPDATE  INTERNET START  CH

NEW INQUIRY

1. INPUT PERSONAL DATA
※ IF USER CODE IS INPUTTED, IT IS NOT NECESSARY TO INPUT THE OTHER ITEMS
※ PLEASE INPUT ONLY NECESSARY ITEMS
★ USER CODE  201806 —701
※ PLEASE INPUT USER CODE BY USING HALF-SIZE FIGURES

COMPANY NAME
DEPARTMENT
POST

2. INPUT YOUR INQUIRY
CONTENTS OF INQUIRY  SECTION 1 ▶  CATEGORY  BUSINESS 1 ▶
CONTENTS OF INQUIRY

AT PRESENT, I AM ON MATERNITY LEAVE, BUT I'LL SOON
RETURN TO MY OLD JOB
PLEASE TELL ME THE RELATED PROCEDURES
—702

PAGE DISPLAYED  INTRANET ZONE

| | |
|---|---|
| FILE(F) EDIT(E) DISPLAY(V) SHIFT(G) FAVORITE(A) HELP(H) | |

LINK　　　🅴 WINDOWS UPDATE　🅴 INTERNET START

CASE NAME UNSET 4

USER CODE : [201808]　　NAME IN CHINESE CHARACTERS : [清水 祐子]　　NAME IN KANA CHARACTERS : [シミズ ヒロコ]　　ENROLLED COMPANY : [　]

BUSINESS TYPE CODE : [1234]　DEPARTMENT : [1234]　COMPANY : [1234]　RETRIEVAL OF USER　ANONYMOUS　CLEAR

OFFICE BUILDING : [OUTSIDE SYSTEM DUMMY OFFICE (9990)]　CLASS : [　▼]　DATE OF FILE : [2000/01/26　19:04:33]

TELEPHONE NUMBER : [0123-45-6789]

| CASE | RETRIEVE | PAST CASE |

FORM OF INQUIRY : [SECTION 1　▼]　CATEGORY : [BUSINESS 1 ▼]　EVALUATION : [NONE ▼]

CONTENTS OF INQUIRY :　　　　　　　　　　　　　　　CONTENTS OF ANSWER :

AT PRESENT, I AM ON MATERNITY LEAVE,
BUT I'LL SOON RETURN TO MY OLD JOB
PLEASE TELL ME THE RELATED
PROCEDURES.

MAIL ANSWER
RECEIVING END ADDRESS [shimizu@xx.co.jp]

"TRANSMISSION HISTORY : [UN-TRANSMISSION]　MAIL TRANSMISSION

[NEXT CASE]
[STORE CASE]

ACQUIRE SOLUTION

[ESCALATION]
[JOB REQUEST]
[CALL-BACK]
[SOLUTION END]
[CLOSE]

STAND-BY　　　　　　　　　　　　　　CASE NAME UNSET 4　　　SYSTEM 19:20

FIG.11

| FILE(F) | EDIT(E) | DISPLAY(V) | SHIFT(G) | FAVORITE(A) | HELP(H) |

LINK  WINDOWS UPDATE  INTERNET START

CASE NAME UNSET 4

USER CODE : 201808  NAME IN CHINESE CHARACTERS : 清水 祐子  NAME IN KANA CHARACTERS : シミズ ヒロコ  RETRIEVAL OF USER  ANONYMOUS  ENROLLED COMPANY :  CLEAR

BUSINESS TYPE CODE : 1234  DEPARTMENT : 1234  COMPANY : 1234  CLASS :  DATE OF FILE : 2000/01/26  19:04:33

OFFICE BUILDING : OUTSIDE SYSTEM DUMMY OFFICE (9990)  TELEPHONE NUMBER : 0123-45-6789

| CASE | RETRIEVE | PAST CASE |

FORM OF INQUIRY : SECTION 1  CATEGORY : BUSINESS 1  EVALUATION : NONE

CONTENTS OF INQUIRY :
AT PRESENT, I AM ON MATERNITY LEAVE, BUT I'LL SOON RETURN TO MY OLD JOB PLEASE TELL ME THE RELATED PROCEDURES

CONTENTS OF ANSWER :
AFTER RETURNING TO WORK, PLEASE INPUT NECESSARY ITEMS IN ACCORDANCE WITH THE MENU SCREEN IN AN XX SYSTEM WORKING CONDITIONS WILL BE DETERMINED BY YOUR SUPERIOR; THEREFORE, PLEASE GET IN TOUCH WITH HIM OR HER

MAIL ANSWER RECEIVING END ADDRESS : shimizu@xx.co.jp

TRANSMISSION HISTORY : [UN-TRANSMISSION]   MAIL TRANSMISSION

| NEXT CASE |
| STORE CASE |
| RETRIEVE FTS |
| RETRIEVE SB |
| ACQUIRE SOLUTION |
| ESCALATION |
| JOB REQUEST |
| CALL-BACK |
| SOLUTION END |
| CLOSE |

STAND-BY        CASE NAME UNSET 4        SYSTEM 19:20

METHOD OF AND SYSTEM FOR CALL SERVICE SYSTEM, AND COMPUTER PRODUCT

FIELD OF THE INVENTION

The present invention relates to a technology of receiving an inquiry from a user in the form of a telephone call, electronic mail, or over a homepage, giving an answer through a telephone call or electronic mail from any one of a plurality of operator terminals.

BACKGROUND OF THE INVENTION

Conventionally, there has been known a call service system in which inquiries from a plurality of users are received through telephone, and operators successively answer these inquiries. For example, in a reservation center in an airline and telephone-number information service in a telecommunication company, each one of a plurality of operators is provided with a operator terminal through which the operator responds to inquiries about empty seats and for telephone numbers.

Moreover, in various companies which used to provide personal and general affairs sections for respective branches so as to carry out personal management and general affairs mainly centered on these personal and general affairs sections, in recent years, they have unified the personal and general affairs sections, and have tried to provide call service systems mainly used for their employees. More specifically, in such a call service system, inquiries through telephone are queue-managed, and successively allocated to respective operator terminals so that the operators are allowed to answer the inquires through telephone.

However, along with the recent development in the Internet based upon the development of the communication electronic technique, in recent years, the call centers need to respond not only to inquiries through telephone, but also to inquiries through electronic mails and homepages.

For this reason, in most of the recent call service systems, operator terminals dealing with inquiries through telephone and operator terminals dealing with inquiries through electronic mails or homepages are provided in a separate manner so as to properly respond to the inquiries through telephone, electronic mails and homepages.

However, even in the above-mentioned conventional technique, a problem arises in which it is difficult to readily respond to user demand for receiving an answer through telephone after having given an inquiry through a homepage. For example, when a user makes an inquiry about personal or general affairs to a call service system, the user is seldom convinced with the matter of the returned answer mail. Because, in most cases, the user wants to make an inquiry about a different but related matter. Moreover, in some cases, the intention of the inquiry from the user is not fully understood by the operator. In this case, the user might receive an unexpected answer.

In such a case, the method in which the operator directly makes a telephone call to the user will fail to properly respond to the inquiry efficiently, and cause an increase in the processing time for each case. Moreover, since another operator that is different from the operator who has given the answer through the mail normally makes a call, there is an increase in personal costs on the call center side. Therefore, it is essential to realize a call service system which can readily satisfy the user demands for receiving an answer through telephone after having given an inquiry through a homepage.

SUMMARY OF THE INVENTION

It is an object of this invention to provide a technology capable of readily, efficiently, and in a versatile manner respond to an inquiry received through telephone, electronic mail or homepage.

According to one aspect of the present invention, a user selects a type of communication media to be used when receiving the answer from an operator terminal in response to an inquiry on a client terminal. The information related to the type of communication media selected by the user, the contents of the inquiry and information related to the user is transmitted to a server. The server manages the inquiries in which a telephone call is selected as a mode of receiving the answer, and the inquiries received in the form of a telephone call in a unified manner. Then the server provides a control to successively process the inquires in the queue on the terminal of the operator. Therefore, the inquiries that are to be answered through a telephone call, and the inquiries received in the form of telephone call can be dealt in a unified manner.

The client terminal may be a telephone machine and a computer which can access homepages or send or receive emails. There may be a plurality of client terminals and operator terminals.

The computer program according to another aspect of the present invention stores instructions which when executed realizes on a computer the method according to the present invention.

The computer readable recording medium according to still another aspect of the present invention stores a computer program which when executed realizes a computer the method according to the present invention.

Other objects and features of this invention will become apparent from the following description with reference to the accompanying drawings.

DESCRIPTION OF THE PREFERRED EMBODIMENTS

Preferred embodiments of the present invention will be explained in detail below with reference to the accompanying drawings. These embodiment exemplifies a case in which the present invention is applied to a call service system used for personal-general affairs sections.

Figure 1:
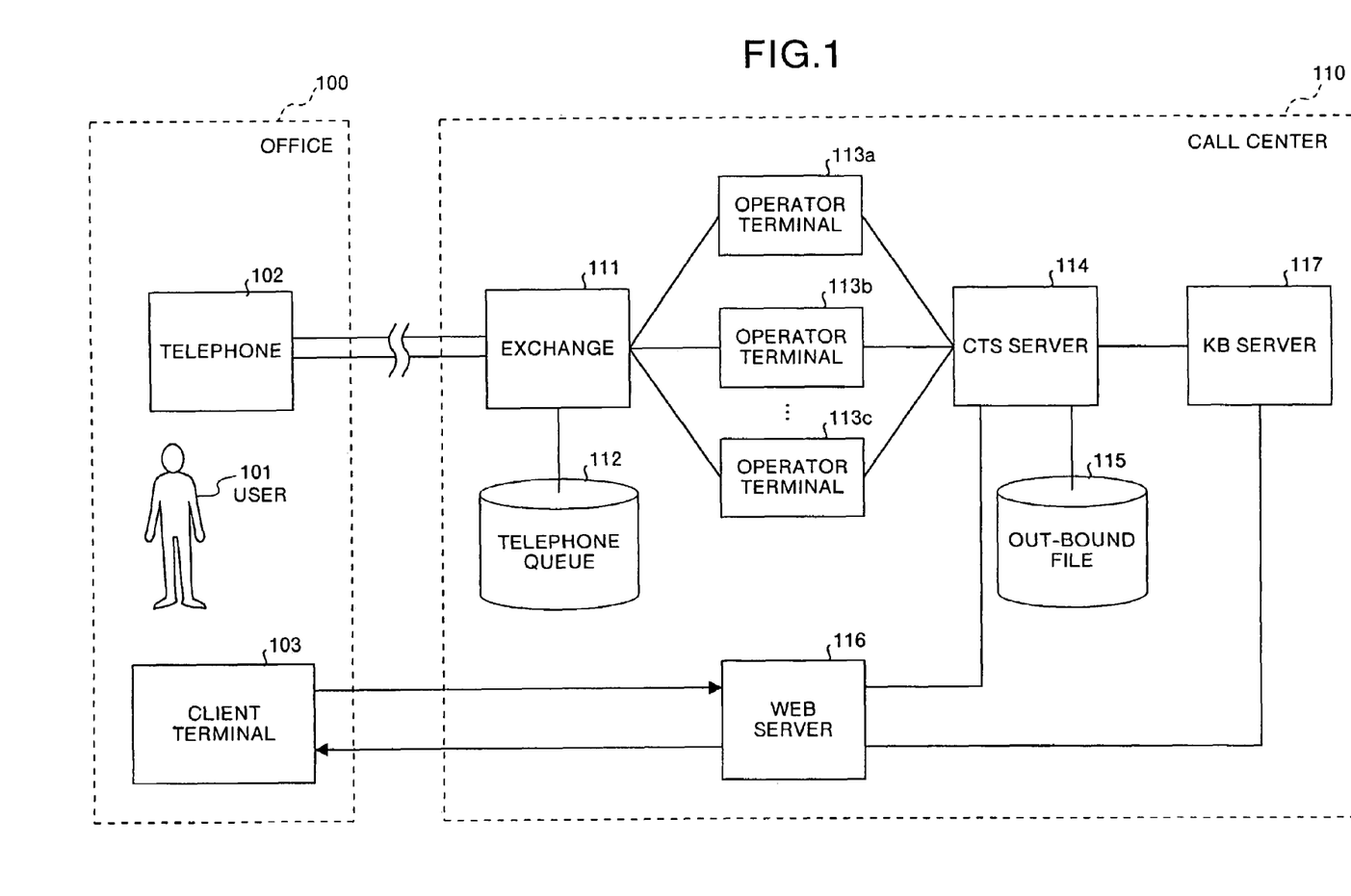
FIG. 1 is a block diagram that shows a system construction of a call service system in accordance with one embodiment.

System construction of a call service system according to one embodiment will now be explained. FIG. 1 is a block diagram that shows the system construction of this call service system. In this system, the user 101 can make an inquiry related to personal or general affairs to the call center 110 either over the telephone 102 or the client terminal 103. The telephone 102 or the client terminal 103 is placed in the working place 100 of the user 101. The user 101 can use the telephone 102 to make a call to or receive a call from the call center 110.

Moreover, the client terminal 103 is a terminal device which can make an access to and transmit an electronic mail to a homepage of the call center 110 by using a predetermined browser. More specifically, this homepage screen is provided with an input frame in which information related to a user is input, an input frame in which the contents of an inquiry are input and an input screen for allowing the user to make a selection as to which communication medium is used to receive the answer to the inquiry, a telephone call or an electronic mail.

When, after having input these items, the user carries out predetermined processes, the information related to the user, the contents of the inquiry and the type of communication media through which the answer is to be received are transmitted to the call center 110. Here, when the selection is made so as to receive the answer to the inquiry through a telephone call, the user can receive the corresponding calling-in from an operator in the call center 110 through the telephone 102. Here, the call center 110 is constituted by an exchange 111, a telephone queue 112, operator terminals 113a to 113c, a CTS server 114, an out-bound file 115, a Web server 116 and a KB server 117.

The exchange 111 is used for establishing a telephone communication line between the operator terminals 113a to 113c and the telephone 102 of the user 101 through a line exchange, and upon receipt of calls from a plurality of telephones, holds a waiting matrix for the calls within the telephone queue 112, and successively allocates these to anyone of the operator terminals 113a to 113c. The telephone queue 112 is a queue for carrying out the waiting process on the calls from the users 101 through telephone. However, the telephone queue 112 carries out the queue-management only on the calls from the telephone 102 of the user 101 to the call center 110, and the telephone queue 112 does not manage inquiries that have been received from other communication media.

The operator terminals 113a to 113c are terminal devices through which the operator answers inquiries from the user 101 through telephone. In particular, in the operator terminals 113a to 113c, calls allocated by the exchange 111 are preferentially received so that when the operator carries out a predetermined operation, the telephone communication line is established with the telephone 102 which has been held. Moreover, if the stand-by state has continued for a predetermined period, the operator terminals 113a to 113c request the CTS server 114 data within the out-bound file 115, which will be described later. When any one of the operator terminal 113a to 113c has received the data from the CTS server 114, it automatically calls out to the telephone number of the telephone contained in the data, and informs the operator of this fact.

Here, the display contents on each of the operator terminals 113a to 113c are different depending on cases in which a call is allocated from the exchange 111 and in which data is taken from the out-bound file 115.

The Web server 116 is a server which functions as a window of the call center 110 that carries data transmission and receipt to and from the client terminal 103 operated by the user 101. More specifically, upon receipt of a request for data base from the client terminal 103, the Web server 116 transmits this request for data base to the KB (knowledge base) server 117. Moreover, upon receipt of an inquiry through an electronic mail or a homepage, it transmits such data to the CTS server 114.

The KB server 117 is a server for managing a knowledge data base in which various past inquiries related to personal-general affairs sections are stored as knowledge, and upon receipt of a request for retrieval of data base from the Web server 116, carries out a retrieval as to whether or not the corresponding knowledge exists on the data base, and returns the results of the retrieval to the Web server 116. Here, in this case, the Web server 116 transfers the results of the retrieval to the client terminal 103.

Moreover, the KB server 117 regularly retrieves the knowledge data base, and extracts data (hereinafter, referred to as "out-bound data") that is to be simultaneously sent to a plurality of users and data (hereinafter, referred to as "call-back data" that is to be called back to the corresponding user, and outputs these to the CTS server 114.

The CTS (Computer Telegram Support) server 114 stores the out-bound data and the call-back data received from the KB server 117 in the out-bound file 115, and also stores inquiry data to be answered through telephone, received from the Web server 116, in the out-bound file 115. Here, for convenience of explanation, an explanation of inquiry data to be answered through an electronic mail is omitted. However, such inquiry data is processed by an operator terminal installed in a separated manner.

Moreover, upon receipt of a request for data from any one of the operator terminals 113a to 113c, the CTS server 114 extracts the out-bound data, call-back data and inquiry data stored in the out-bound file 115, and transfers these to the operator terminals 113a to 113c.

The out-bound file 115 is a kind of queue that stores the out-bound data, call-back data and inquiry data in the order of receipts. Here, since such inquiry data is a kind of in-bound data that is forwarded from the user 101 side to the call center 110 side, it is said that the out-bound file 115 deals with the out-bound data, call-back data and in-bound data in a unified manner.

In the call service system having the above-mentioned construction, since a selection can be made from the retrieval of the knowledge data base, an inquiry through an electronic mail and an answer through telephone from the inquiry screen of a homepage of the Web server 116, the user 101 is allowed to receive a totalized service based upon the unified screen.

Moreover, when the answer through telephone is selected on the homepage, one of the operator terminals 113a to 113c, received this data, automatically calls out to the telephone 102 of the user 101 so that it is possible to reduce the work load imposed on the operator. In particular, any one of the unoccupied operator terminals 113a to 113c is allowed to request for data in the out-bound file 115. Therefore, it is possible to easily increase operator terminals. Furthermore, since the out-bound data, call-back data and in-bound data are unified in the out-bound file 115, data exchange to and from the respective operators can be carried out efficiently.

Figure 2:
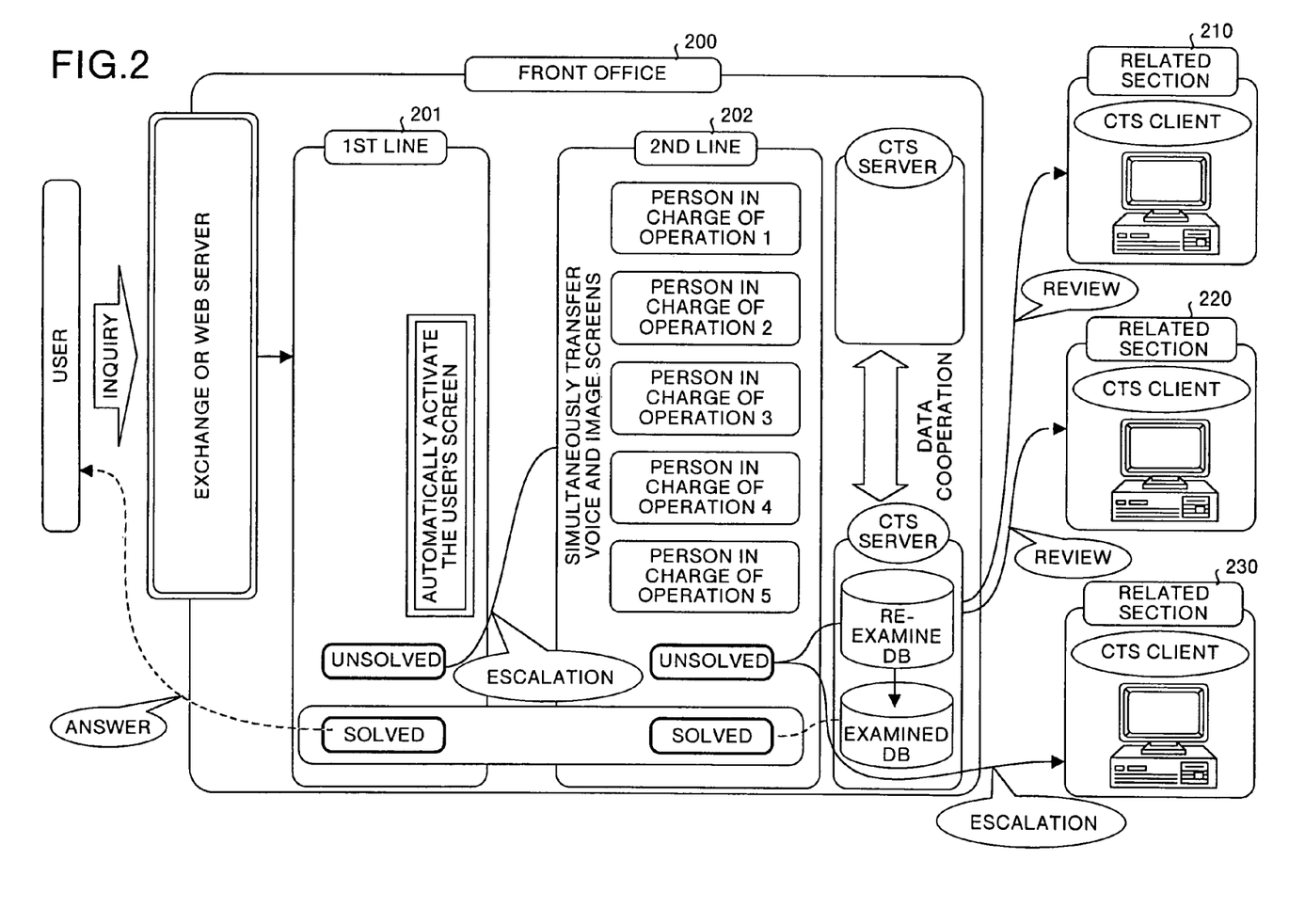
FIG. 2 is an explanatory drawing that shows call receiving procedures in an operator terminal shown in FIG. 1.

Next, a detailed explanation will be given of a call handling operation by the operator using the operator terminals 113a to 113c shown in FIG. 1. FIG. 2 is an explanatory drawing that shows the call handling operation by the operator using the operator terminals 113a to 113c shown in FIG. 1. As illustrated in this Figure, from the viewpoint of the call handling operation, the call center 110 is constituted by a front office 200, a main office personal section 210, a head quarter personal section 220, a back-office 230, etc.

The front office 200 is constituted by a first line (1st line) 201 for carrying out a normal call handling operation and a second line (2nd line) 202 of a technical operation group for carrying out a call handling operation when the first line 201 fails to solve a specific problem. To this first line 201, operators handling personal affairs, wages, financial affairs, life insurance (social insurance), working conditions, travel expenses, systems, etc. are assigned. In this case, however, one operator may handle a plurality of the items. Here, each of the operator terminals can automatically activate a screen related to a subject (a user having an inquiry).

To the second line 202, persons in charge of the respective operations (operation 1 to operation 5) are assigned, and these persons normally carry out the operations related to personal affairs, wages, etc. Only when the first line 201 fails to solve a specific problem, the specific inquiry is escalated to the second line 202, and the corresponding voice and image screens are simultaneously transferred thereto. After the contents of an answer has been formed in the second line 202, the contents of the answer are call-back-registered in the out-bound file 115, or given to the telephone 102 through a call.

Additionally, when the specific problem can not be solved even by the second line 202, it is further escalated to the back office 230 where the expert is available. Here, those inquiries that have been solved and those that have not been solved are respectively stored in the CTS server in a separated manner, and those inquires can be reviewed from the main office personal section 210 and the head quarter personal section 220.

In this manner, in the present embodiment, the operators in the front office 201 are arranged in the two systems of the first line 201 and the second line 202 so that the first line 201 accepts inquiries and basically handles them, and only when the expert's help is required, the second line 202 accepts the escalation, and this is combined into the first line 201 only when the number of waiting calls has increased. Therefore, it is possible to smoothly absorb the difference between the high rate and low rate in the operation rate of the operators.

Figure 3:
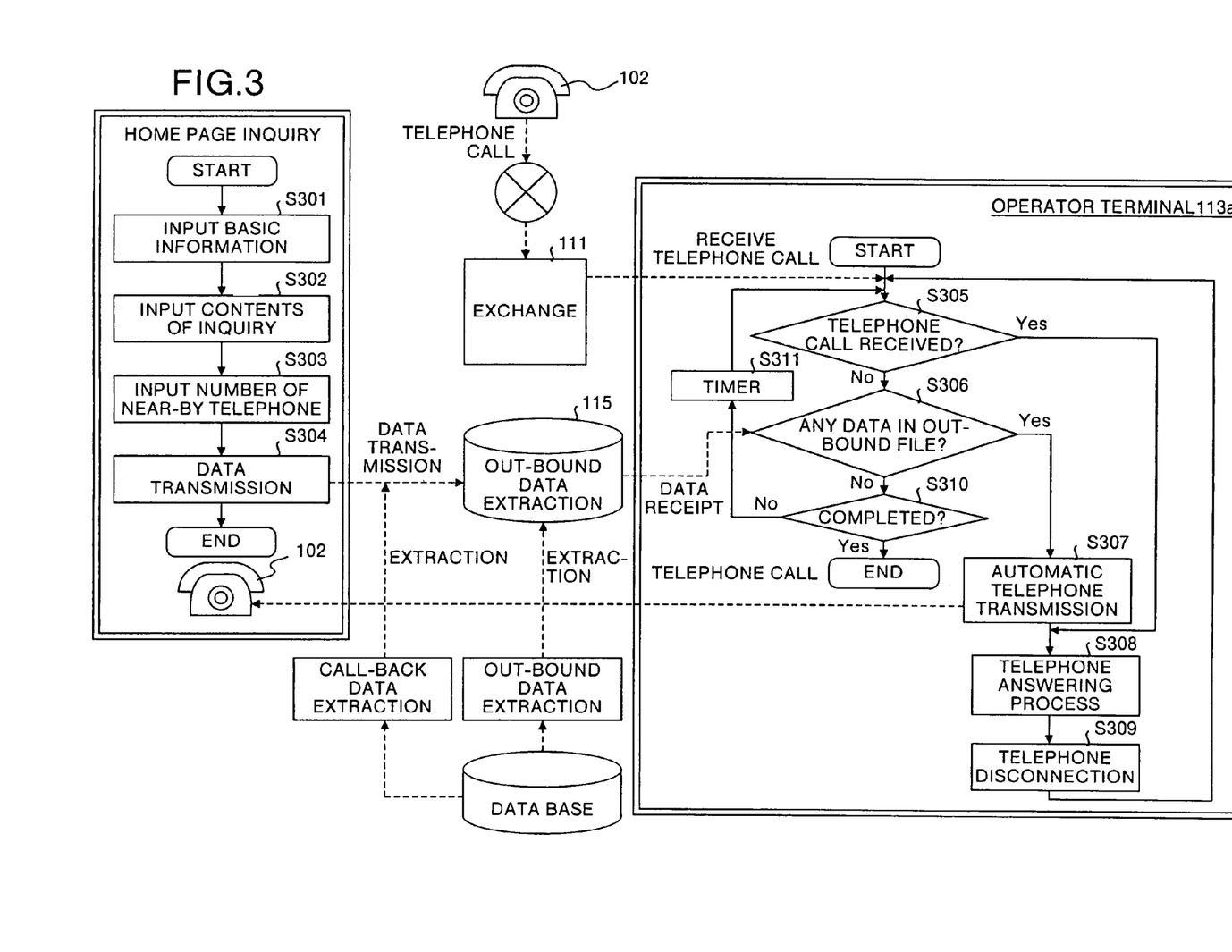
FIG. 3 is an explanatory drawing that shows processing steps that are carried out by the operator terminal shown in FIG. 1.

Next, an explanation will be given of a sequence of processes in the operator terminals 113a to 113c shown in FIG. 1. FIG. 3 is an explanatory drawing that explains the sequence of processes in the operator terminal 113a shown in FIG. 1. Here, the same processes are carried out in the operator terminals 113b to 113c. As illustrated in this Figure, telephone calls and data arrive in the operator terminal 113a through two routes. More specifically, a user 101 gives a telephone call to the call center 110 through the telephone 102, the operator terminal 113a receives the telephone call through a public line network and the exchange 111.

Moreover, when, on a homepage of the client terminal 103, a user 101 inputs basic information such as information related the user and selection of the type of media through which the answer is received (step S301), inputs the contents of an inquiry (step S302), inputs the number of the near-by telephone (the telephone number of the telephone 102) (step S303) and specifies a predetermined input frame so as to transmit the inquiry data (step S304), the inquiry data is stored in the out-bound file 115 through the Web server 116. Thus, the operator terminal 113a first confirms whether or not there is any received telephone call (step S305), and if there is any received telephone call (Yes, at step S305), the operator answers the call (step S308), and the telephone line is then disconnected (step S309).

In contrast, if there is no received telephone call (No, at step S305), the operator confirms whether or not there is any data in the out-bound file 115 (step S306), and if there is any data (Yes, at step S306), the operator gives an automatic transmission to the telephone 102 (step S307), carries out a telephone call process (step S308), and then makes the telephone line disconnected (step S309). Moreover, when there is no data in the out-bound file 115 (No, in step S306), after a timer has counted a predetermined period time until the process has been finished, the sequence proceeds to step S305 (step S310 to S311).

Here, the reason why the confirmation of the receipt of the telephone call at step S305 is more preferentially made than the confirmation of the receipt of the data within the out-bound file 115 at step S306 is because it is necessary to preferentially process the telephone call connected through the on-line. However, the steps S305 and S206 may be regularly reversed so that a fixed amount of the received data may be processed within the out-bound file 115.

Figure 4:
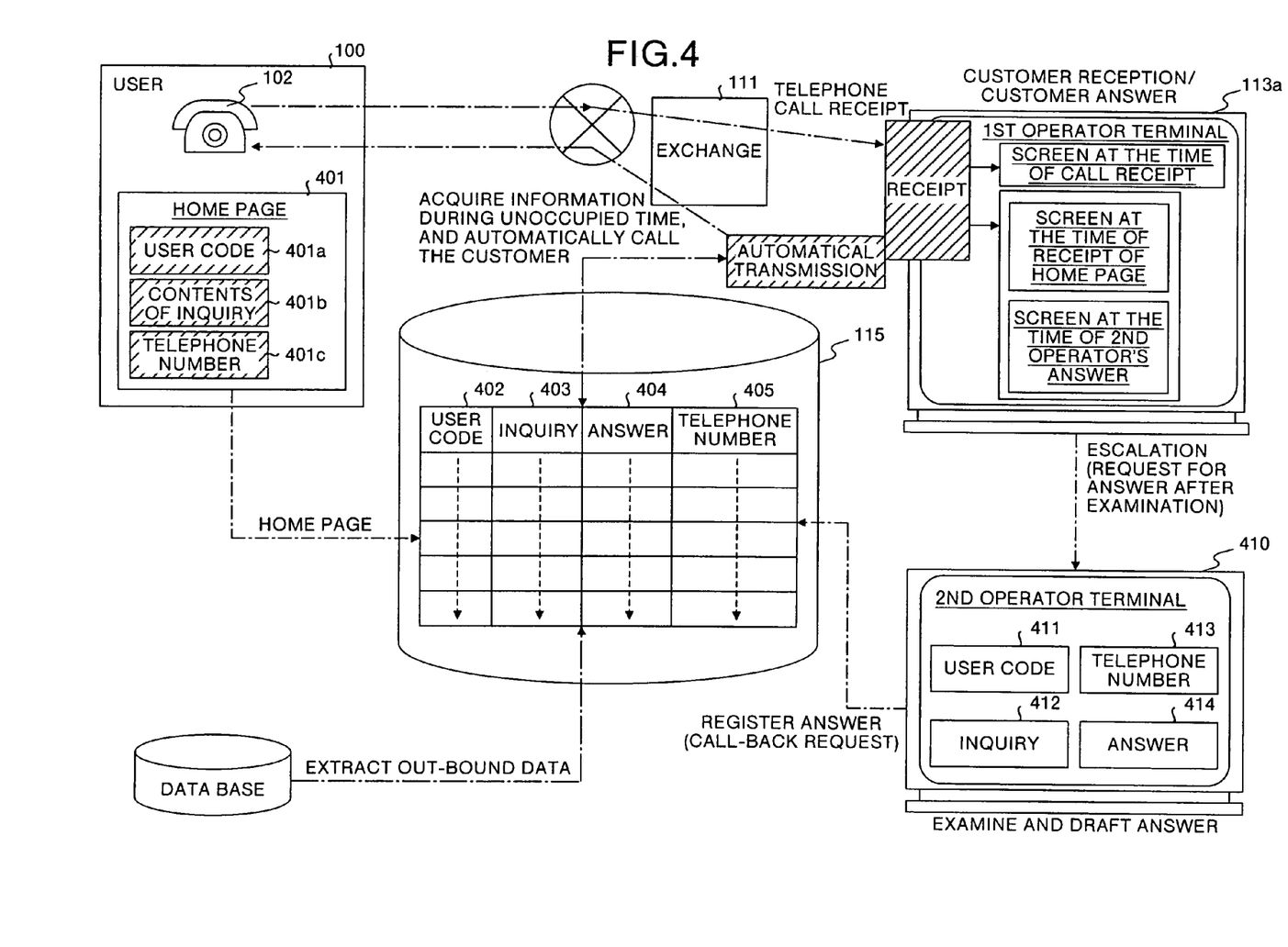
FIG. 4 is an explanatory drawing that shows a flow of data in the call service system shown in FIG. 1.

Next, an explanation will be given of a flow of data and screen display images in the call service system shown in FIG. 1. FIG. 4 is an explanatory drawing that shows the flow of data in the call service system shown in FIG. 1. Moreover, FIG. 5 to FIG. 12 are drawings that show examples of respective display screens. As shown in these Figures, when a user 101 makes a telephone call to the call center 110 from the telephone 102 in his or her office 100, the telephone call arrives at the exchange 111 through the public line network, and is then received by an operator terminal of the first line. Here, for convenience of explanation, the operator terminal 113a is set to be the first line terminal, and the operator terminal 410 is set to be the second line terminal.

Figure 5:
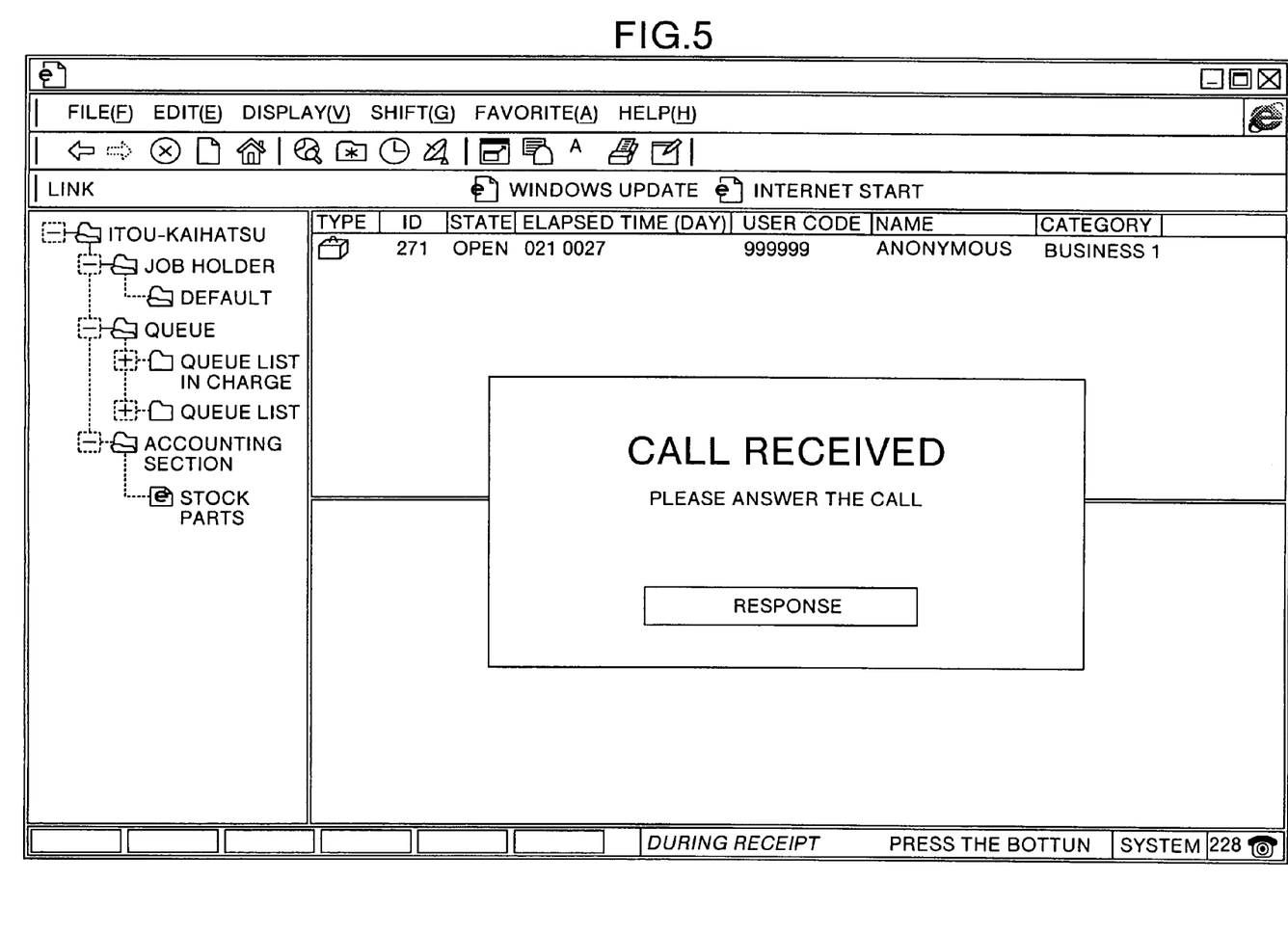
FIG. 5 is a drawing that shows one example of a display screen upon receipt of a telephone call in the operator terminal shown in FIG. 4.
Figure 6:
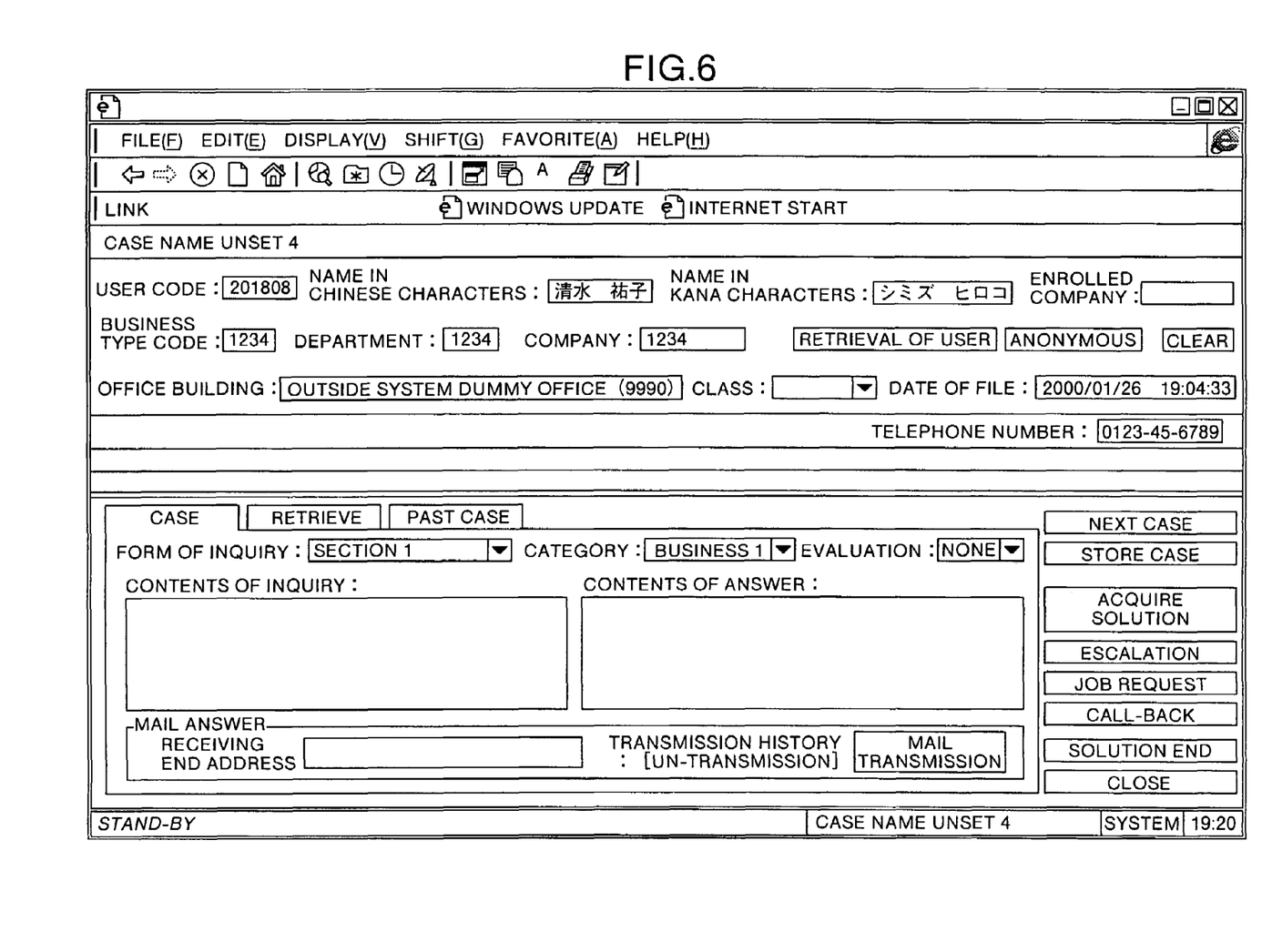
FIG. 6 is a drawing that shows one example of a display screen upon clicking a response button shown in FIG. 5.

FIG. 5 shows one example of the display screen at the time when the operator terminal 113a, shown in FIG. 4, has received the telephone call, and FIG. 6 shows one example of the display screen at the time when a response button, shown in FIG. 5, has been clicked.

As illustrated in FIG. 5, in this case, a message "Call received", which clearly informs the operator of the fact that there is any received telephone call, is widely displayed on the screen. Thus, the operator on the terminal 113a answers the call, receives the contents of an inquiry, and gives an answer to the user. Here, when the response button in FIG. 5 is clicked, only information related to the user, as shown FIG. 6, is displayed on the screen of the operator terminal 113a. Here, when a user gives an inquiry through a homepage on the client terminal 103 in the office 100, the user inputs a user code 401a, the contents of the inquiry 401b, a telephone number 401c, etc., in the home pate 401, and transmit these.

Figure 7:
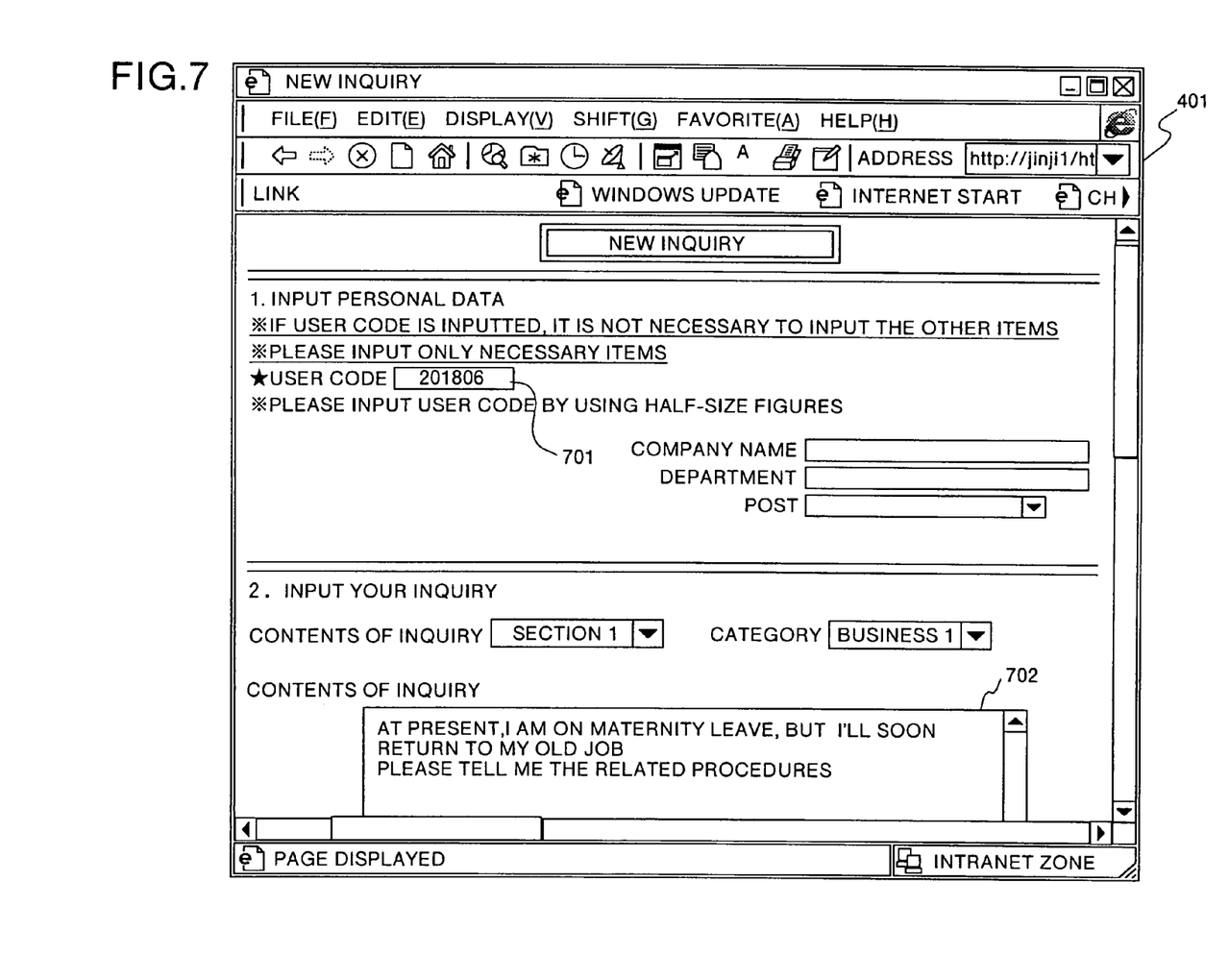
FIG. 7 is a drawing that shows one example of a homepage on a client terminal shown in FIG. 4.
Figure 8:
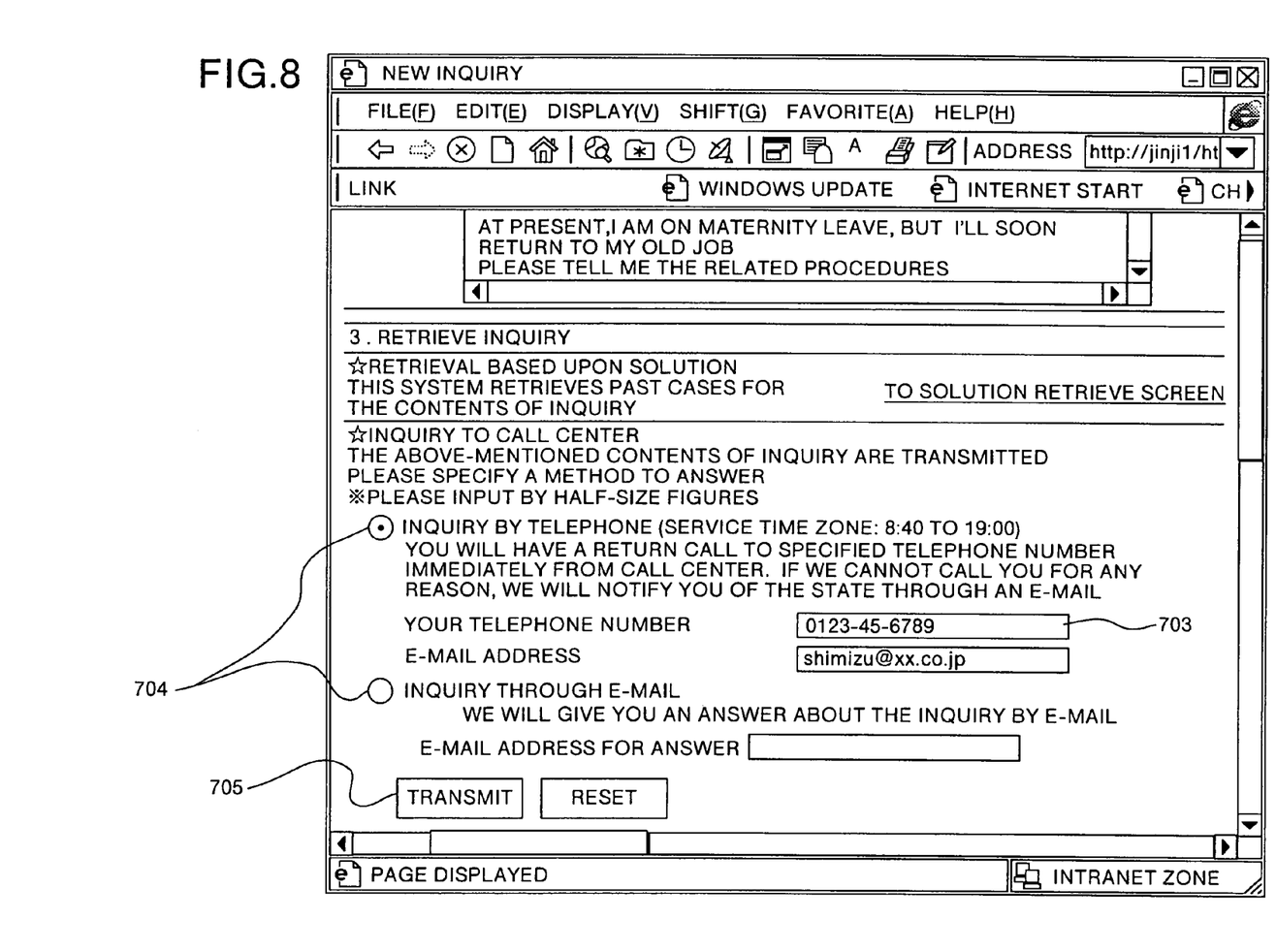
FIG. 8 is a drawing that shows another example of a homepage on the client terminal shown in FIG. 4.

FIG. 7 and FIG. 8 are drawings that show one example of the homepage 401 on the client terminal shown in FIG. 4. The homepage 401 is provided with an input frame 701 through which the user number 401a is input, an input frame 702 in which the contents 401b of an inquiry is input, and an input frame 703 in which the telephone number 401c is input. Moreover, there is also a selection frame 704 for allowing a selection as to whether an answer to the inquiry is given through an electronic mail or through telephone. When a transmission button 705 is clicked, these data are transmitted to the Web server 116, and stored inside the out-bound file 115.

Again in FIG. 4, the out-bound file 115 is provided with a user code frame 402, an inquiry contents frame 403, an answer contents frame 404 and a telephone number frame 405, and in accordance with these forms, the inquiry data is stored in the out-bound file 115. Here, the out-bound data and the call-back data are extracted from the knowledge data base of the KB server 117, if necessary, and stored in the out-bound file 115.

Accordingly, the out-bound data, call-back data and inquiry data are stored in the out-bound file 115 so that the operator terminal 113a requests data within the out-bound file 115 during an unoccupied time, and automatically transmits the resulting data to the telephone 102 of the user 101 so as to allow the operator to confirm the connection of the telephone line.

Figure 9:
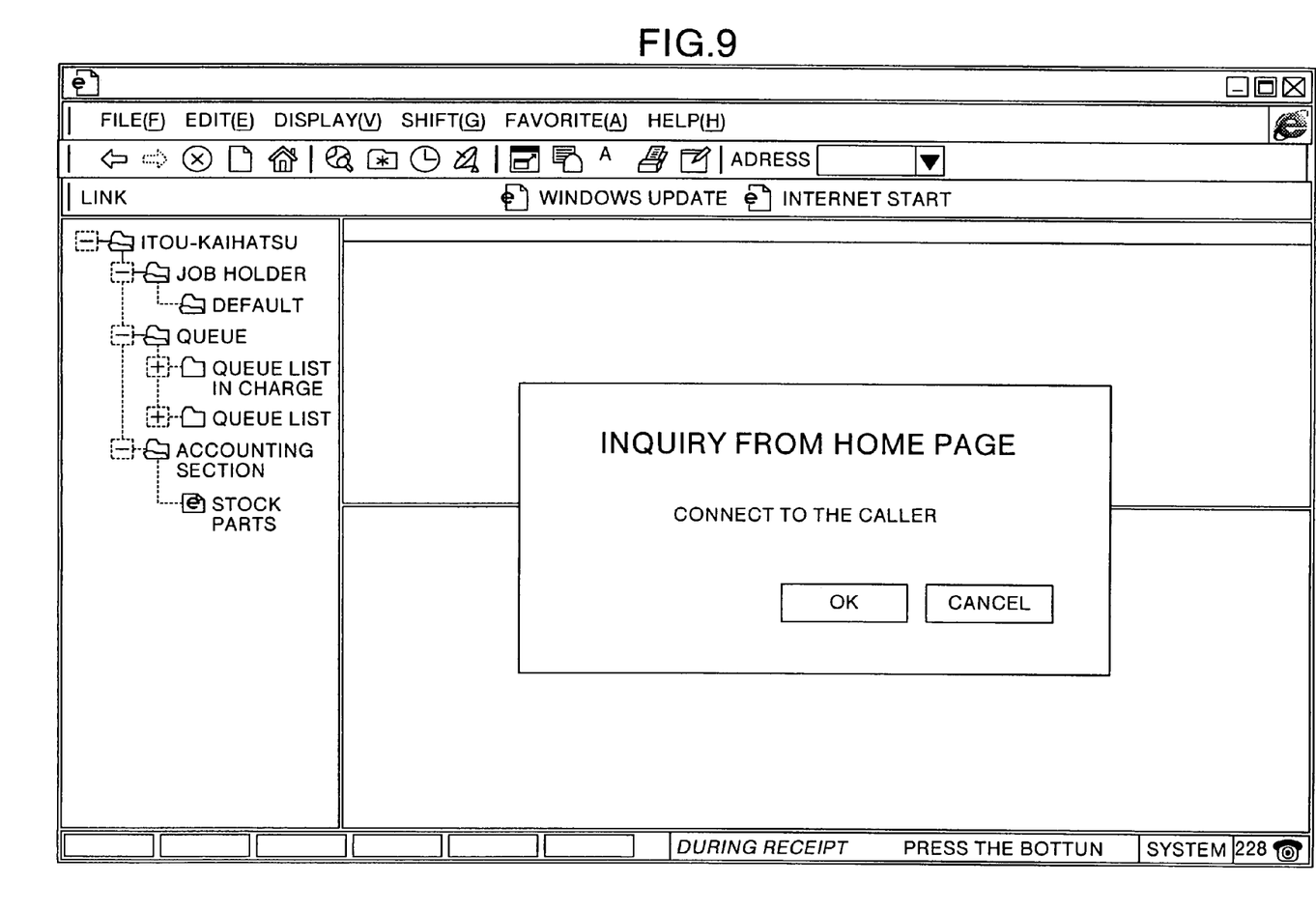
FIG. 9 is a drawing that shows another example of a display screen upon receipt of a communication on the operator terminal shown in FIG. 4 through the homepage.
Figure 10:
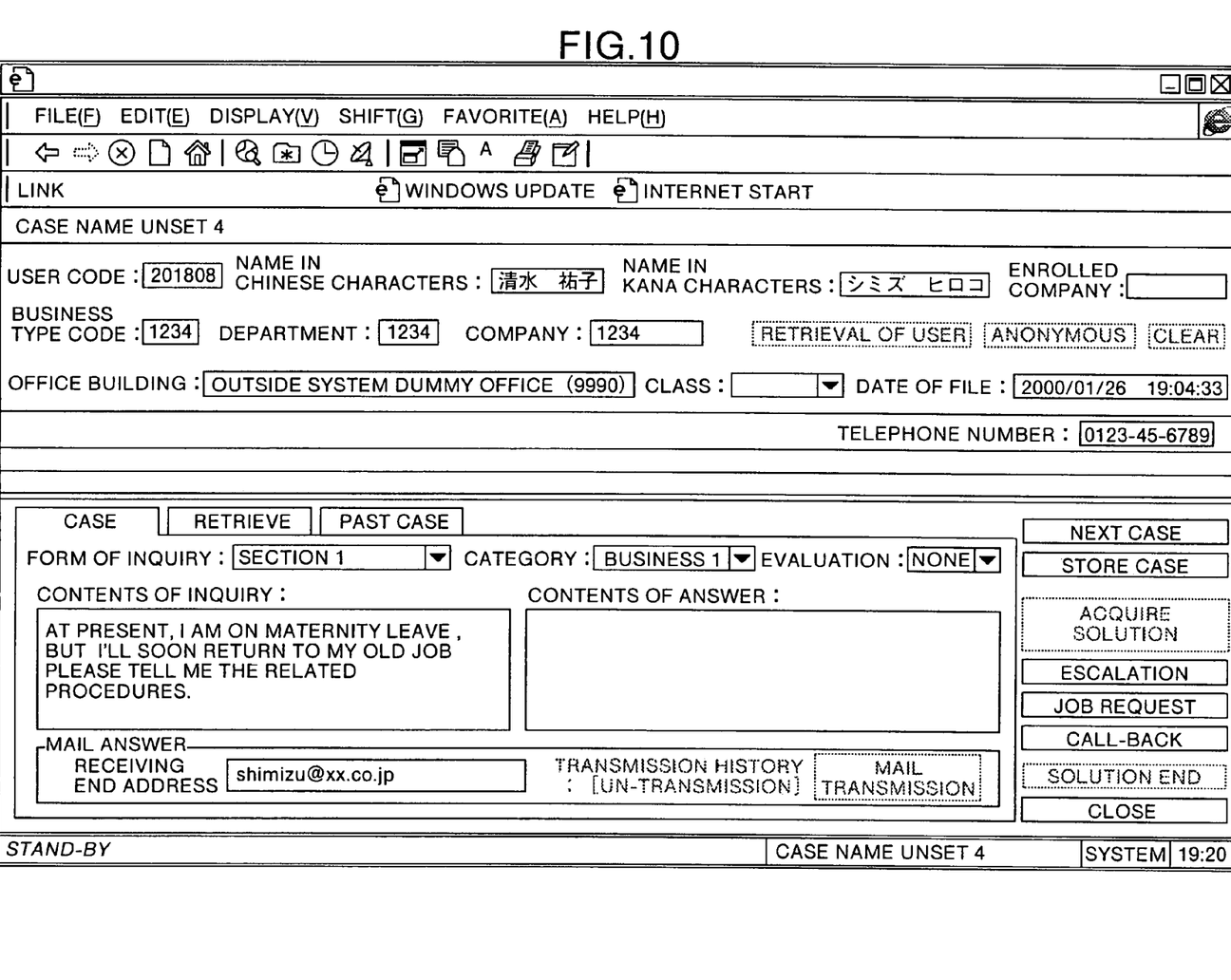
FIG. 10 is a drawing that shows one example of a display screen that is given when OK button of FIG. 9 is clicked.

FIG. 9 is a drawing that shows one example of the display screen when a transmission from the homepage has arrived in the operator terminal 113a shown in FIG. 4, and FIG. 10 is a drawing that shows one example of a screen at the time when an OK button shown in FIG. 9 is clicked.

As illustrated in FIG. 9, in this case, a message "Inquiry from the homepage", which clearly indicates that there is any data arrival from the homepage, is widely displayed on the screen. When the OK button in the center of this message is clicked, a screen shown in FIG. 10 is displayed. As illustrated in FIG. 10, in this display screen, not only the information related to the user, but also the contents of the inquiry are displayed. Thus, the operator of the operator terminal 113a recognizes that the inquiry is given through the homepage, answers the call while considering the contents of the inquiry, and gives an answer to the user about the contents of the inquiry.

When the operator of the operator terminal 113a in the first line is unable to answer the inquiry, the inquiry is escalated to the operator terminal 410 in the second line. In other words, the escalation of this type allows the operator terminal 410 in the second line to display data, such as the user code 411, the contents of the inquiry 412 and the telephone number 410. Thus, in the operator terminal 410 in the second line, the contents of the inquiry 412 are examined, the contents of an answer 414 are formed, and the resulting data is answer-registered in the out-bound file 115 as a call-back request.

Figure 11:
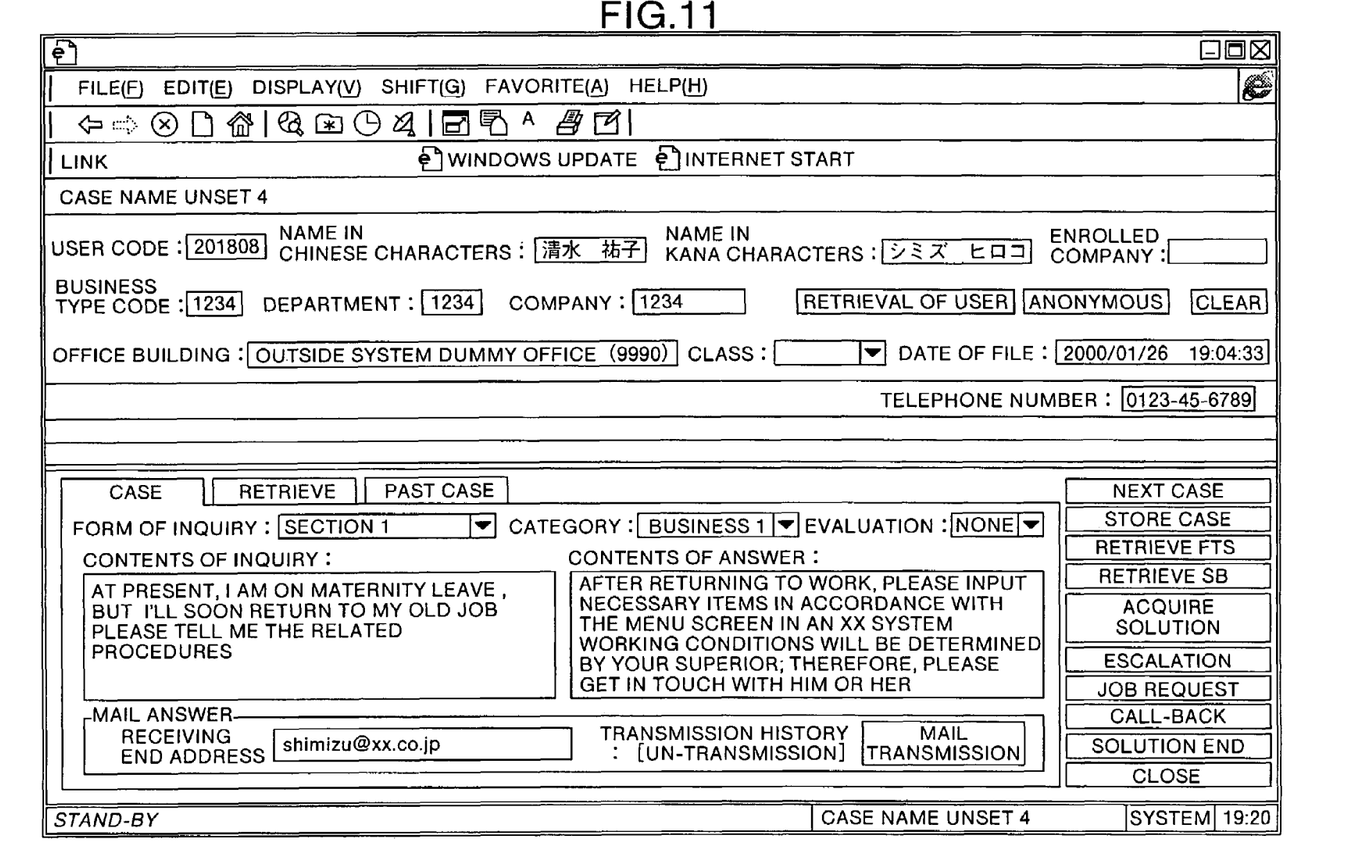
FIG. 11 is a drawing that shows one example of a display screen in which, upon escalation from an operator terminal of a first line to an operation terminal of a second line, the operation terminal of the second line is shown.

FIG. 11 is a drawing that shows one example of the display screen on the operator terminal 410 in the second line when the escalation has been made from the operator terminal 113a in the first line to the operator terminal 410 in the second line. The display screen formed by adding the contents of the answer to the contents of the display of FIG. 10 is provided on the operator terminal 410.

As described above, in the present embodiment, an arrangement is made so that, from the inquiry screen of the homepage of the Web server 116, a selection is made among the retrieval of the knowledge database, the inquiry through an electronic mail and the receipt of an answer through telephone. Therefore, the user 101 is allowed to receive a totalized service based upon the unified screen.

Moreover, when the answer through telephone is selected in the homepage, the corresponding one of operator terminals 113a to 113c automatically calls out to the telephone 102 of the user 101. Therefore, it is possible to reduce work loads imposed on the operators.

Furthermore, any one of the unoccupied operator terminals 113a to 113c is allowed to request for data in the out-bound file 115. Therefore, it is possible to easily increase operator terminals. Furthermore, since the out-bound data, call-back data and in-bound data are unified in the out-bound file 115, data exchange to and from the respective operators can be carried out efficiently.

The present embodiment has exemplified a case in which the telephone queue 112 and the out-bound file 115 are placed in a separated manner. However, the present invention is not intended to be limited by this arrangement, and both of the queues may be unified into one. The unified queue of this type makes it possible to utilize the analogy of the operator-terminal load control given by the exchange to a maximum degree.

Moreover, the present embodiment has exemplified a case in which the present invention is applied to the call service system related to the personal-general affairs sections. However, the present invention is not intended to be limited by this, and the present invention may be applied to a reservation system in air lines, a telephone number system in communication enterprises, or a user support system in makers.

As described above, according to the present invention, a type of communication media, which is to be used upon informing the user of the contents of the answer through the user interface on the client terminal used by the user from the operator terminal, is selected, the type of communication media selected in the selection step, the contents of the inquiry and information related to the user to the server are transmitted to the server; the inquiries in which telephone is selected as the type of communication media that have been transmitted and the inquiries through telephone from the users are queue-managed in a unified manner by the server, and the inquires that have been managed are successively processed by using the plurality of operator terminals. Therefore, the inquiries in which telephone is selected as the type of communication media and the inquiries from the users through telephone can be handled in a unified manner, thereby making it possible to provide a call service system which can readily respond to an inquiry received through telephone, an electronic mail or a homepage efficiently in a versatile manner.

Moreover, a first queue consisting of a waiting matrix for inquiries in which telephone has been selected as the type of communication media and a second queue consisting of the inquiries from the users through telephone are managed, and the inquires inside the second queue are allocated to the respective operator terminals, while when any inquiry within the second queue has not been allocated thereto for a predetermined period of time, each of the operator terminals accepts the inquiries of the first queue successively. Therefore, it becomes possible to provide a call service system in which, without changing any system related to inquiries through telephone, the inquiries in which telephone is selected as the type of communication media are efficiently processed by utilizing unoccupied operator terminals, Moreover, the inquiries in which telephone is selected as the type of communication media and the inquiries from the users through telephone are managed by using a single queue, and the inquiries inside the queue are allocated to the respective operator terminals based upon a predetermined rule. Therefore, it is possible to provide a call system which can deal with the inquiries efficiently by utilizing the system related to inquiries through telephone.

Moreover, a demand for notification given to the operator terminals so as to simultaneously notify the plurality of users of information items, inquiries in which telephone is selected as the type of communication media, and inquiries from the users through telephone are queue-managed in a unified manner. Therefore, it is possible to provide a call service system which can also deal with a process referred to as an out-bound, transmitted from the operator terminal side, in a unified manner.

Moreover, the user interface is prepared as a home-page inquiry screen that is provided with at least an input frame for allowing a selection among a retrieval of knowledge data base, an inquiry through an electronic mail and an inquiry through telephone, an input frame used for inputting information related to the user and an input frame in which the contents of an inquiry are input. Therefore, it is possible to provide a call service system which efficiently allows a selection from the retrieval of knowledge database, the inquiry through an electronic mail and the inquiry through telephone, on the homepage.

Moreover, a type of communication media, which is to be used upon informing the user of the contents of the answer through the user interface on the client terminal used by the user from the operator terminal, is selected, the type of communication media thus selected, the contents of the inquiry and information related to the user is transmitted to the server, the inquiries in which telephone is selected as the type of communication media that have been transmitted and the inquiries from the users through telephone are queue-managed in a unified manner by the server, and the inquires that have been managed are successively processed by using the plurality of operator terminals. Therefore, it is possible to deal with the inquiries in which telephone is selected as the type of communication media and the inquiries from the users through telephone in a unified manner, and consequently to provide a call service system which can readily respond to an inquiry received through telephone, an electronic mail or a homepage efficiently in a versatile manner.

Moreover, a type of communication media, which is to be used upon informing the user of the contents of the answer through the user interface on the client terminal used by the user from the operator terminal, is selected, the type of communication media thus selected, the contents of the inquiry and information related to the user is transmitted to the server, the inquiries in which telephone is selected as the type of communication media that have been transmitted and the inquiries from the users through telephone are queue-managed in a unified manner by the server, and the inquires that have been managed are successively processed by using the plurality of operator terminals. Therefore, it is possible to realize the operation for dealing with the inquiries in which telephone is selected as the type of communication media and the inquiries from the users through telephone in a unified manner by utilizing a computer, and consequently to provide a recording medium that allows the computer to execute a call service method which can readily respond to an inquiry received through telephone, an electronic mail or a homepage efficiently in a versatile manner.

A computer program containing instructions which when executed on a computer causes the computer to perform the method according to the present invention is recorded on computer readable-recording medium. This computer readable-recording medium may be a floppy disk or a CD-ROM. Alternately the program may be stored at a server and the program may be downloaded when required. Otherwise, the program may be executed while it is at the server, i.e. without downloading from the server.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A call service system comprising:
   at least one client terminal through which a user can make an inquiry, said client terminal being a computer which can access homepages or send or receive emails;
   at least one first-line operator terminal through which a first operator receives the inquiry from the user and answers the inquiry;
   at least one second-line operator terminal through which a second operator receives the inquiry from the user via the first-line operator terminal and answers the inquiry, when the first operator fails to solve a problem relating to the inquiry and requires an expert's help;
   a server connected with said client terminal and said operator terminal;
   said client terminal including,
   a graphical user interface which allows the user to select a communication media to be used when receiving the answer from the operator and to input contents of the inquiry and information related to the user, the user's selection being made between at least two available communication media choices comprising a telephone and an email; and
   a transmission unit which transmits the information related to the communication media selected by the user, the contents of the inquiry, and the information related to the user to said server, wherein
   said first-line operator terminal is configured to display a first screen for displaying information related to the user, and a second screen for displaying the problem,
   said second-line operator terminal is configured to display the first screen and the second screen when the problem is escalated to the second-line operator terminal and is configured to allow the second operator to input an answer to the problem, and
   said server includes,
   a queue-managing unit which queue-manages inquiries in which the user has either selected a telephone call or an e-mail as the communication media for receiving the answer; and
   a processing unit which successively processes the inquiries in a queue for said first-line operator terminal such that said first-line operator terminal communicates with the client terminal using the communication media selected when answering the inquiry.

2. The call service system according to claim 1, wherein said queue-managing unit manages the inquiries in which the user has either selected a telephone call as the communication media for receiving the answer or made the inquiry over a telephone, in one queue, and
   said processing unit successively allocates the inquiries in the queue to said first operator terminal in accordance with a predetermined rule.

3. The call service system according to claim 1, wherein the communication media to be used when receiving the answer from the operator is allowed to be different from a communication media used when sending the inquiry from the user.

4. The call service system according to claim 1, wherein said user interface comprises a homepage inquiry screen that is provided with at least an input frame for allowing a selection among a retrieval of knowledge data base, an inquiry through an electronic mail and an inquiry through telephone, an input frame used for inputting information related to the user and an input frame in which the contents of an inquiry are input.

5. A call service system according to claim 1, wherein said graphical user interface comprises:
a telephone number entry frame for a telephone number entered by the user for a telephone answer;
an email address entry frame for an email address entered by the user for an email answer; and
an inquiry frame for the inquiry entered by the user.

6. A call service method of receiving an inquiry from a client terminal of a user, giving an answer to the inquiry through at least one first-line operator terminal or at least one second-line operator terminal, said client terminal being a computer which can access homepages or send or receive emails, the method comprising:
selecting a communication media to be used when receiving the answer from said first-line operator terminal or said second-line operator terminal and inputting contents of the inquiry and information related to the user at the client terminal, allowing the communication media selected to be different from a communication media used when sending the inquiry, the selection and the input being performed by a user using a graphical user interface of said client terminal, the user's selection being made between at least two available communication media choices comprising a telephone and an email;
transmitting information related to the communication media selected by the user, the contents of the inquiry and information related to the user, to a server;
queue-managing inquiries in which a telephone call or an e-mail has been selected as the communication media;
receiving the inquiry at said first-line operator terminal;
displaying a first screen for displaying information related to the user, and a second screen for displaying the problem at said first-line operator terminal;
answering the inquiry at said first-line operator terminal when said first-line operator terminal is capable of answering the inquiry;
sending information from said first-line operator terminal to said second-line operator terminal when said first-line operator terminal fails to answer the inquiry and requires an expert's help;
displaying the first screen and the second screen at said second-line operator terminal, when the problem is escalated to the second-line operator terminal;
answering the inquiry at said second-line operator terminal;
providing a control to successively process the inquiries in the queue for said first-line operator terminal; and
communicating with the client terminal using the communication media selected when answering the inquiry.

7. A computer-readable recording medium that stores a computer program which when executed on a computer realizes a method of receiving an inquiry from a client terminal of a user, giving an answer to the inquiry through at least one first-line operator terminal or at least one second-line operator terminal, said client terminal being a computer which can access homepages or send or receive emails, the computer program making the computer realize the steps of:
displaying a graphical user interface on said client terminal of the user for selecting a communication media to be used when receiving the answer from said first-line operator terminal or said second-line operator terminal and for inputting contents of the inquiry and information related to the user, allowing the communication media selected to be different from a communication media used when sending the inquiry, where the user's selection is made between at least two available communication media choices comprising a telephone and an email;
transmitting information related to the communication media selected by the user from said client terminal, the contents of the inquiry, and the information related to the user to a server;
queue-managing inquiries in which a telephone call or an e-mail has been selected as a type of the communication media;
receiving the inquiry at said first-line operator terminal;
displaying a first screen for displaying information related to the user, and a second screen for displaying the problem at said first-line operator terminal;
answering the inquiry at said first-line operator terminal when said first-line operator terminal is capable of answering the inquiry;
sending information from said first-line operator terminal to said second-line operator terminal when said first-line operator terminal fails to answer the inquiry and requires an expert's help;
displaying the first screen and the second screen at said second-line operator terminal, when the problem is escalated to the second-line operator terminal;
answering the inquiry at said second-line operator terminal;
providing a control to successively process the inquiries in the queue for said first-line operator terminal; and
communicating with the client terminal using the communication media selected when answering the inquiry.

8. A computer program which when executed on a computer realizes a method of receiving an inquiry from a client terminal of a user, giving an answer to the inquiry through at least one first-line operator terminal or at least one second-line operator terminal, said client terminal being a computer which can access homepages or send or receive emails, the computer program making the computer realize a process comprising:
displaying a graphical user interface on said client terminal of the user for selecting a communication media to be used when receiving the answer from said first-line operator terminal or said second-line operator terminal and for inputting contents of the inquiry and information related to the user, allowing the communication media selected to be different from a communication media used when sending the inquiry, where the user's selection is made between at least two available communication media choices comprising a telephone and an email;
transmitting information related to the communication media selected by the user from said client terminal, the contents of the inquiry, and the information related to the user to a server;

queue-managing inquiries in which a telephone call or an e-mail has been selected as a type of the communication media;

receiving the inquiry at said first-line operator terminal;

displaying a first screen for displaying information related to the user, and a second screen for displaying the problem at said first-line operator terminal;

answering the inquiry at said first-line operator terminal when said first-line operator terminal is capable of answering the inquiry;

sending information from said first-line operator terminal to said second-line operator terminal when said first-line operator terminal fails to answer the inquiry and requires an expert's help;

displaying the first screen and the second screen at said second-line operator terminal, when the problem is escalated to the second-line operator terminal;

answering the inquiry at said second-line operator terminal;

providing a control to successively process the inquiries in a queue for said first-line operator terminal; and communicating with the client terminal using the communication media selected when answering the inquiry.

9. A call center for a call service system, the call service system including at least one client terminal, capable of accessing homepages or send or receive emails, through which a user can make an inquiry, the call center comprising:

a server being capable of communicating with said client terminal;

at least one first-line operator terminal, connected to said server, for receiving the inquiry from the user and for answering the inquiry; and at least one second-line operator terminal, connected to said server, for receiving the inquiry from the user via the first-line operator terminal and for answering the inquiry, when an operator at said first-line operator terminal fails to answer the inquiry and requires an expert's help, wherein said first-line operator terminal is configured to display a first screen for displaying information related to the user, and a second screen for displaying the inquiry, said second-line operator terminal is configured to display the first screen and the second screen when the inquiry is escalated to the second-line operator terminal and is configured to allow the second operator to input an answer to the query, and said server includes, a queue-managing unit which queue-manages inquiries in which the user has either selected a telephone call or an e-mail as communication media for receiving the answer; and a processing unit which successively processes the inquiries in a queue for said first-line operator terminal such that said first-line operator terminal communicates with the client terminal using the communication media selected when answering the inquiry.

* * * * *